United States Patent
Cross et al.

(10) Patent No.: US 9,396,323 B2
(45) Date of Patent: Jul. 19, 2016

(54) UNAUTHORIZED ACCOUNT ACCESS LOCKOUT REDUCTION

(71) Applicant: INTERNATIONAL BUSINESS MACHINES CORPORATION, Armonk, NY (US)

(72) Inventors: Micah M. Cross, Rocky Mount, NC (US); Sharan J. Patel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/995,265

(22) Filed: Jan. 14, 2016

(65) Prior Publication Data

US 2016/0132677 A1    May 12, 2016

Related U.S. Application Data

(63) Continuation of application No. 14/189,703, filed on Feb. 25, 2014, now Pat. No. 9,275,219.

(51) Int. Cl.
  *G06F 21/45*  (2013.01)
  *H04L 29/06*  (2006.01)
  *G06F 21/31*  (2013.01)

(52) U.S. Cl.
  CPC .............. *G06F 21/45* (2013.01); *H04L 63/083* (2013.01); *G06F 21/31* (2013.01)

(58) Field of Classification Search
  CPC ........ G06F 21/31; G06F 21/45; H04L 63/083
  See application file for complete search history.

(56) References Cited

U.S. PATENT DOCUMENTS

| 5,495,235 | A  | * | 2/1996  | Durinovic-Johri | ...... G06F 21/31 340/5.27 |
| 5,696,824 | A  |   | 12/1997 | Walsh |  |
| 7,512,803 | B2 | * | 3/2009  | Schaffer | .................. G06F 21/31 713/183 |
| 8,200,582 | B1 |   | 6/2012  | Zhu |  |
| 8,248,237 | B2 |   | 8/2012  | Fitzgerald et al. |  |
| 8,490,162 | B1 |   | 7/2013  | Popoveniuc et al. |  |
| 8,578,476 | B2 | * | 11/2013 | Sama | ...................... G06F 21/31 713/183 |
| 8,607,314 | B2 |   | 12/2013 | Barrett |  |
| 9,275,219 | B2 |   | 3/2016  | Cross et al. |  |

(Continued)

OTHER PUBLICATIONS

Office Action (Mail Date May 19, 2015) for U.S. Appl. No. 14/189,703, filed Feb. 25, 2014; Confirmation No. 3216.

(Continued)

*Primary Examiner* — Joseph P Hirl
*Assistant Examiner* — Stephen Gundry
(74) *Attorney, Agent, or Firm* — Schmeiser, Olsen & Watts; John R. Pivnichny

(57) ABSTRACT

A method and system for determining unauthorized account access is provided. The method includes receiving a username of a user and a passcode for access to a secure account or device belonging to a user. The passcode is determined to be incorrect. Unauthorized access attempts with respect to the secure account or the device are determined based on based on the incorrect passcode and in response, a quality factor associated with the incorrect passcode with respect to the secure account or device is determined. The quality factor is compared to a threshold value. Security functions associated with the secure account or device with respect to the incorrect passcode and the results of the comparison are performed based on the quality factor and the unauthorized access attempts.

20 Claims, 3 Drawing Sheets

(56) References Cited

U.S. PATENT DOCUMENTS

| | | | |
|---|---|---|---|
| 2002/0067832 A1* | 6/2002 | Jablon | H04L 9/0844 380/277 |
| 2002/0078350 A1* | 6/2002 | Sandhu | G06F 21/46 713/168 |
| 2002/0108046 A1 | 8/2002 | Armingaud | |
| 2005/0114673 A1* | 5/2005 | Raikar | G06F 21/46 713/182 |
| 2006/0041756 A1 | 2/2006 | Ashok et al. | |
| 2006/0080544 A1 | 4/2006 | Schaffer | |
| 2006/0294392 A1 | 12/2006 | Veprek et al. | |
| 2007/0250920 A1* | 10/2007 | Lindsay | G06F 21/31 726/7 |
| 2008/0282091 A1* | 11/2008 | Ashok | G06F 21/31 713/183 |
| 2010/0125906 A1 | 5/2010 | Golle et al. | |
| 2010/0192205 A1 | 7/2010 | Chaudhry et al. | |
| 2012/0060213 A1* | 3/2012 | Childress | G06F 21/31 726/18 |
| 2012/0246708 A1* | 9/2012 | Chaudhry | G06F 21/31 726/7 |
| 2013/0091564 A1 | 4/2013 | Fitzgerald et al. | |
| 2013/0194067 A1 | 8/2013 | Kimbrell | |
| 2013/0219454 A1 | 8/2013 | Hewinson | |
| 2013/0254875 A1 | 9/2013 | Sama | |
| 2014/0038556 A1 | 2/2014 | De Sousa | |
| 2014/0157390 A1 | 6/2014 | Lurey et al. | |
| 2014/0253466 A1 | 9/2014 | Brewer | |
| 2015/0199500 A1* | 7/2015 | Jagtap | H04L 63/083 726/1 |
| 2015/0242603 A1 | 8/2015 | Cross et al. | |
| 2015/0295913 A1* | 10/2015 | Foote | G06F 21/31 726/6 |

OTHER PUBLICATIONS

Amendment filed Aug. 17, 2015 in response to Office Action (Mail Date May 19, 2015) for U.S. Appl. No. 14/189,703, filed Feb. 25, 2014; Confirmation No. 3216.

Notice of Allowance (Mail Date Nov. 10, 2015) for U.S. Appl. No. 14/189,703, filed Feb. 25, 2014; Confirmation No. 3216.

\* cited by examiner

UNAUTHORIZED ACCOUNT ACCESS LOCKOUT REDUCTION

This application is a continuation application claiming priority to Ser. No. 14/189,703 filed Feb. 25, 2014.

FIELD

The present invention relates generally to a method for reducing unauthorized account access lockout and in particular to a method and associated system determining a quality of an unauthorized account access attempt.

BACKGROUND

Accessing devices typically includes an inaccurate process with little flexibility. Preventing access to a user device may include a complicated process that may be time consuming and require a large amount of resources. Accordingly, there exists a need in the art to overcome at least some of the deficiencies and limitations described herein above.

SUMMARY

A first aspect of the invention provides a method comprising: receiving, by a computer processor of a computing system, a username of a user and a passcode for access to a secure account or device belonging to the user; determining, by the computer processor, that the passcode comprises an incorrect passcode; determining, by the computer processor based on the incorrect passcode, unauthorized access attempts associated with the secure account or device; determining, by the computer processor, a quality factor associated with the incorrect passcode with respect to the secure account or device; comparing, by the computer processor, the quality factor to a predetermined threshold value; and performing, by the computer processor based on results of the comparing and the unauthorized access attempts, security functions associated with the secure account or device with respect to the incorrect passcode.

A second aspect of the invention provides a computing system comprising a computer processor coupled to a computer-readable memory unit, the memory unit comprising instructions that when executed by the computer processor implements a method comprising: receiving, by the computer processor, a username of a user and a passcode for access to a secure account or device belonging to the user; determining, by the computer processor, that the passcode comprises an incorrect passcode; determining, by the computer processor based on the incorrect passcode, unauthorized access attempts associated with the secure account or device; determining, by the computer processor, a quality factor associated with the incorrect passcode with respect to the secure account or device; comparing, by the computer processor, the quality factor to a predetermined threshold value; and performing, by the computer processor based on results of the comparing and the unauthorized access attempts, security functions associated with said secure account or device with respect to said incorrect passcode.

A third aspect of the invention provides a computer program product, comprising a computer readable hardware storage device storing a computer readable program code, the computer readable program code comprising an algorithm that when executed by a computer processor of a computer system implements a method, the method comprising: receiving, by the computer processor, a username of a user and a passcode for access to a secure account or device belonging to the user; determining, by the computer processor, that the passcode comprises an incorrect passcode; determining, by the computer processor based on the incorrect passcode, unauthorized access attempts associated with the secure account or device; determining, by the computer processor, a quality factor associated with the incorrect passcode with respect to the secure account or device; comparing, by the computer processor, the quality factor to a predetermined threshold value; and performing, by the computer processor based on results of the comparing and the unauthorized access attempts, security functions associated with the secure account or device with respect to the incorrect passcode.

The present invention advantageously provides a simple method and associated system capable of accessing devices.

DETAILED DESCRIPTION

Figure 1:
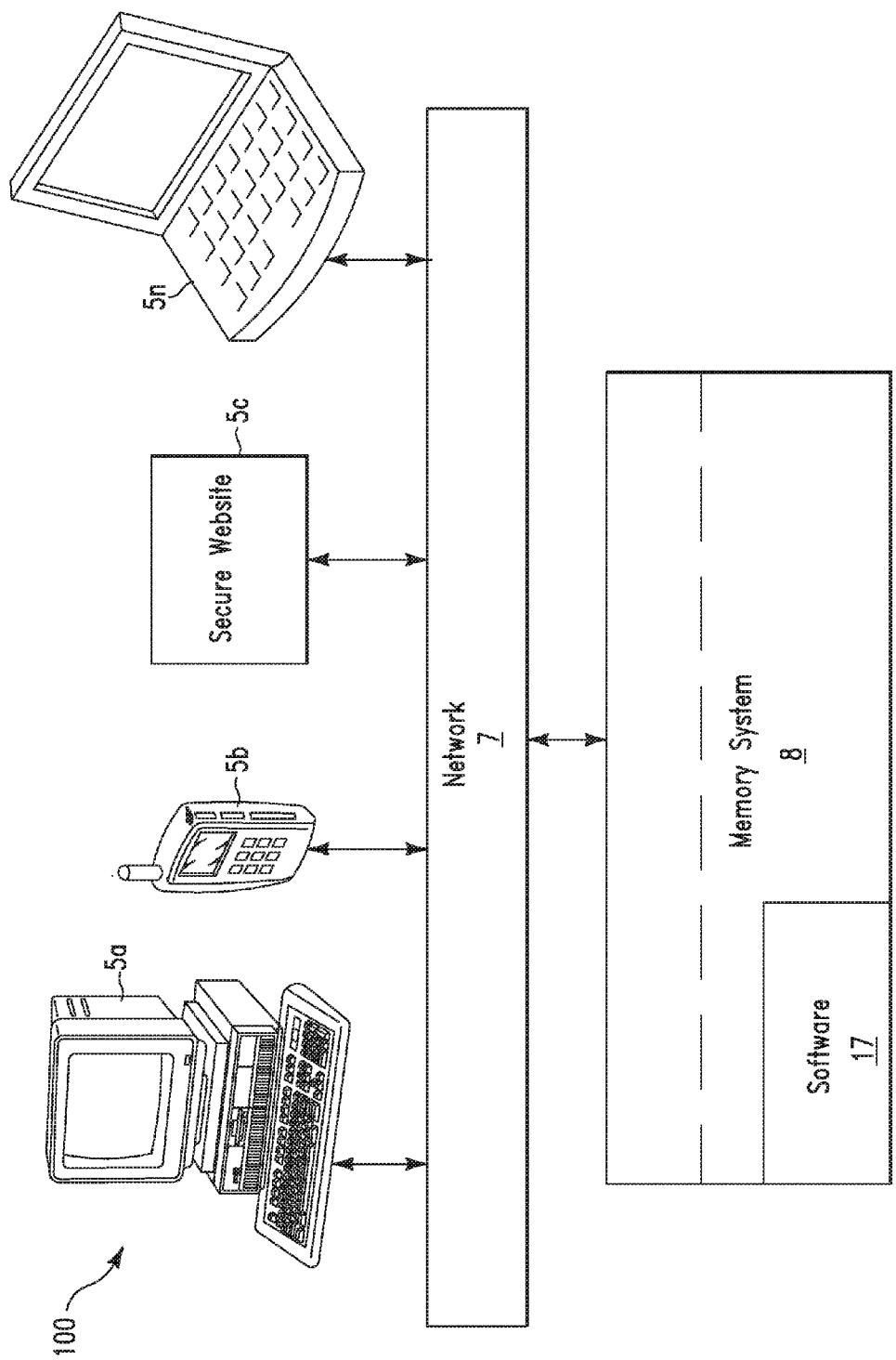
FIG. 1 illustrates a system for reducing unauthorized device or account access lockouts, in accordance with embodiments of the present invention.

FIG. 1 illustrates a system 100 for reducing unauthorized device or account access lockouts, in accordance with embodiments of the present invention. System 100 enables a process for determining a quality of an unauthorized account access attempt. A quality of an unauthorized account access attempt may be determined by analyzing increments of account access attempts thereby triggering a lockout based on a match a threshold percentage (e.g. 50%) of characters and positions in a password, PIN, or other credential. A login session may be initiated from a different system (IP address) with respect to a process for allowing an authorized login into an account or device.

System 100 of FIG. 1 includes devices 5a . . . 5n connected through a network 7 to a computing system 14. Network 7 may include any type of network including, inter alia, a local area network, (LAN), a wide area network (WAN), the Internet, a wireless network, etc. Devices 5a . . . 5n may include any type of computing devices or software systems including, inter alia, a computer (PC), a laptop computer, a tablet computer, a server, a PDA, a smart phone, a secure Website, an application, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17.

System 100 enables a process for preventing unauthorized access to accounts and devices by automatically locking or performing a memory reset (of an associated device) after a specified number of invalid login attempts (e.g. 5 to 10 retries with respect to the account or device. In order to prevent a false access lockout or device reset from occurring (e.g., accidental incorrect password entry by an authorized user), a quality factor associated with associated with an incorrect login attempt may be determined. The quality factor is used to determine if a device lockout process or memory reset process should be executed. For example, an algorithm may be executed to determine specific increments associated with incorrect login attempts that trigger a lockout or memory reset process. The quality factor indicates that the entered passcode (e.g., password, PIN, additional credentials, etc.) must match at least some percentage (e.g., 50%) of the characters and/or positions in the passcode. If the quality factor is determined to be less than a specified threshold, a session-specific access attempt count is incremented without performing a lockout or memory reset process. With respect to low quality access attempts (i.e., a low quality factor), a session-specific increment count may be triggered. The session-specific increment may be used for presenting a message and enforcing local login prevention without actually locking the account or resetting a memory. With respect to a session-specific login lockout, re-allowing login attempts may be triggered via a variety of conditions. For example, if a login session is initiated from a different system (e.g., IP address) or after a configurable time frame parameter (e.g., 30 minutes has been reached between attempts), additional conditions may be used to initiate acceptance of attempts to log into the account or device.

The following examples illustrate implementation scenarios and are described as follows:

Example 1

System 100 is configured to enable a process for: automatically locking a user out of a device or secure account (e.g., one of devices 5a . . . 5n) or performing a memory reset for one of devices 5a . . . 5n after five determined quality login attempts (e.g., 50% or more of characters and/or associated positions match an original passcode) in combination with a thirty minute access reset allowance timeframe. For example (based on the aforementioned configuration), a user picks up a device (e.g., one of devices 5a . . . 5n) and performs random login sequence attempts. In response, software in the device and/or software 17 determines that the random login sequence attempts comprise low quality login attempts (e.g., 50% or less characters and/or associated positions match an original passcode). The random login sequence attempts are blocked after five tries, but the device is enabled to be logged into again after a half hour.

Example 2

System 100 is configured to enable a process for: automatically locking a user out of a device or secure account (e.g., one of devices 5a . . . 5n) or performing a memory reset for one of devices 5a . . . 5n after five determined quality login attempts (e.g., 50% or more of characters and/or associated positions match an original passcode) in combination with approved logins (to the device or secure account) from separate IP addresses. For example (based on the aforementioned configuration), a friend or colleague (of a user authorized to access the device or secure account) knows a user ID (of the user) and proceeds to enable a prank by entering false passcodes in order to lock out access to the device or secure account. In response, system 100 determines that the false passcodes comprise low quality login attempts (e.g., 50% or less characters and/or associated positions match an original passcode) and presents a false lockout sequence. However, the actual account owner (i.e., the user) may connect from a different IP address and hostname in order to log in without requiring an account reset from technical support. As an alternative example (based on the aforementioned configuration), an individual performs malicious denial of service attempts (with respect to the device). In response, system 100 determines that the false passcodes comprise low quality login attempts (e.g., 50% or less characters and/or associated positions match an original passcode) and prevents enabling a denial of service process for the true device/account owner. Additionally, system 100 is presented with a false message indicating that the device/account has been locked out (i.e., the device/account has actually been locked out).

System 100 enables a process for triggering a comparison of a quality of the actual contents of the passcode. System 100 may initialize a comparison with passcode values stored in a passcode vault or other secure repository. System 100 enables a process for locking a device/account based on quality of a passcode attempt and enabling different behavior between quality and non-quality unauthorized access attempts.

Figure 2:
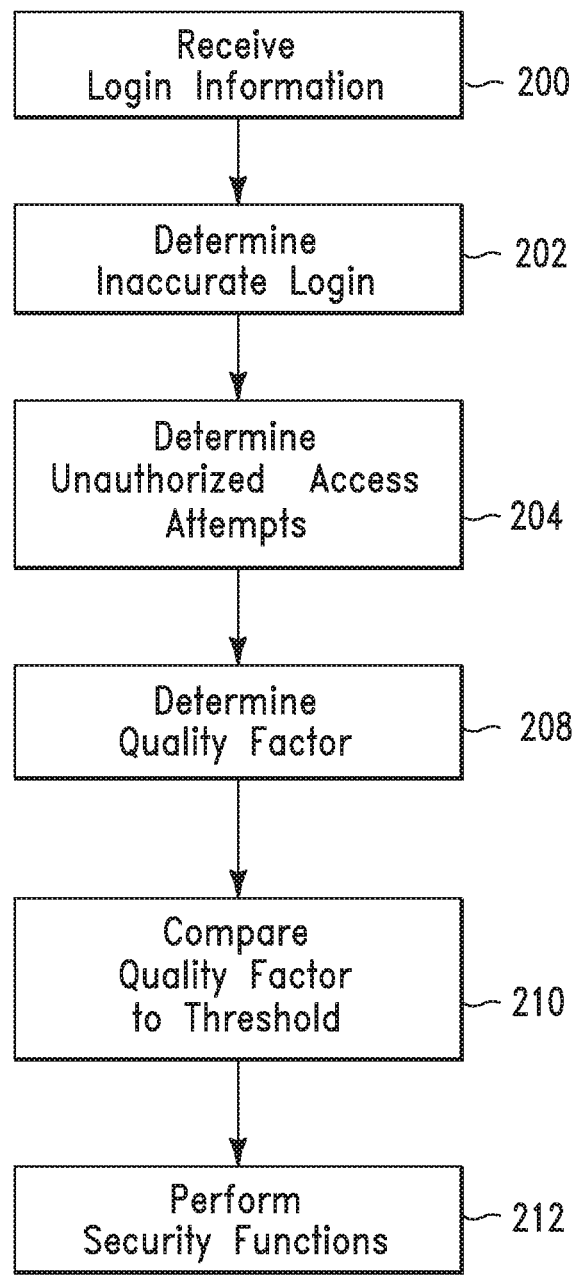
FIG. 2 illustrates an algorithm detailing a process flow enabled by the system of FIG. 1 for reducing unauthorized device or account access lockouts, in accordance with embodiments of the present invention.

FIG. 2 illustrates an algorithm detailing a process flow enabled by system 100 of FIG. 1 for reducing unauthorized device or account access lockouts or memory resets, in accordance with embodiments of the present invention. Each of the steps in the algorithm of FIG. 2 may be enabled and executed in any order by a computer processor executing computer code. In step 200, a username of a user and a passcode (i.e., a password, a pin number, a user name, etc.) for access to a secure account or device (belonging to the user) is received by a computer processor (of the device or associated system). In step 202 it is determined that the passcode comprises an incorrect passcode. In step 204, it is determined (based on the incorrect passcode) that unauthorized access attempts have been executed with respect to the secure account or device. In step 208, a quality factor associated with the incorrect passcode (and with respect to the secure account or device) is determined. The quality factor may indicate a specified percentage of correct characters (of the incorrect passcode) with respect to the (correct) passcode. The specified percentage of correct characters may indicate a specified level of quality of the incorrect passcode with respect to the passcode. Alternatively, the quality factor may indicate a progression of a pattern of characters matching characters of the passcode within a specified number of passcode input attempts. In step 210, the quality factor is compared to a predetermined threshold value. In step 212, security functions associated with the secure account or device (with respect to the incorrect passcode) are performed based on results of the comparison process of step 410 and the unauthorized access attempts. If the results of the comparison process of step 410 indicate that the quality factor exceeds the predetermined threshold (i.e., indicating a high quality unauthorized login attempt), then the security functions may include the following processes:
1. Disabling the user ID from access to the secure account or device.
2. Locking (for a specified time period) the secure account or device from being accessed.
3. Deleting all information from secure account or device.
4. Enabling access from an alternative location to the secure account or device.

If the results of the comparison process of step 410 indicate that the quality factor is less than the predetermined threshold (i.e., indicating a low quality unauthorized login attempt), then the security functions may include the following processes:
1. Determining that a lockout function of the secure account or device is not required and Indicating (e.g., via a graphical user interface) that the secure account or device has been locked out.
2. Determining that a system memory wipe function of said secure account or device is not required and indicating (e.g., via a graphical user interface) that the system memory wipe function of said secure account or device secure account has been performed.

Figure 3:
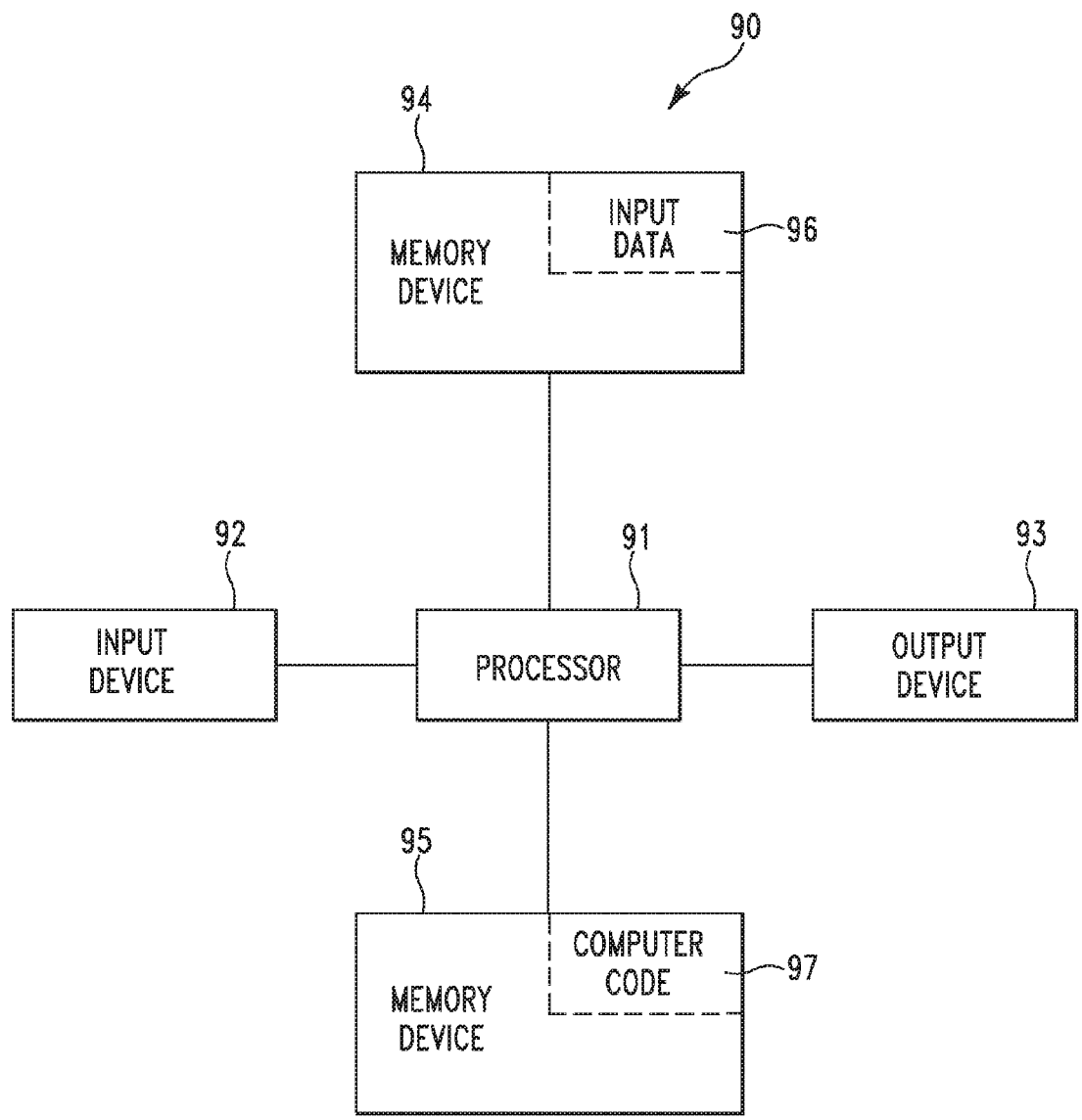
FIG. 3 illustrates a computer apparatus used by the system of FIG. 1 for reducing unauthorized device or account access lockouts, in accordance with embodiments of the present invention.

FIG. 3 illustrates a computer system 90 used by system 100 of FIG. 1 for reducing unauthorized device or account access lockouts or memory resets, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for reducing unauthorized device or account access lockouts or memory resets. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to reduce unauthorized device or account access lockouts or memory resets. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for reducing unauthorized device or account access lockouts or memory resets. In another embodiment, the invention provides a business method that performs the process steps of the invention on a subscription, advertising, and/or fee basis. That is, a service supplier, such as a Solution Integrator, could offer to reduce unauthorized device or account access lockouts or memory resets. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An unauthorized passcode access reduction method comprising:
   remotely receiving over a network, by a computer processor of a computing system from a user via a remote system comprising a first IP address, a username of a user and a passcode for access to a secure account or device belonging to said user, wherein said first IP address differs from a second IP address of said computing system;
   determining, by said computer processor based on said passcode being determined as an incorrect passcode and determining that said user is accessing said computing system via said first IP address, unauthorized access attempts associated with said secure account or device;
   determining, by said computer processor, a quality factor associated with said incorrect passcode with respect to said secure account or device, wherein said quality factor indicates a specified percentage and associated correct position of correct characters within said passcode;
   comparing, by said computer processor, said quality factor to a predetermined threshold percentage value indicating a threshold percentage and position of correct characters within said passcode; and
   performing, by said computer processor based on results of said comparing and said unauthorized access attempts, security functions associated with prevention of a false access lockout or reset process with respect to said secure account or device with respect to said incorrect passcode.

2. The method of claim 1, wherein said quality factor indicates a progression of a pattern of characters matching characters of said passcode within a specified number of passcode input attempts.

3. The method of claim 1, wherein said quality factor indicates a specified level of quality of said incorrect passcode with respect to said passcode, wherein said results of said comparing indicate that said quality factor exceeds said predetermined threshold, and wherein said performing said security functions comprises:
   disabling said username from access to said secure account or device.

4. The method of claim 3, wherein said performing said security functions further comprises:
   locking said secure account or device from being accessed.

5. The method of claim 3, wherein said performing said security functions further comprises:
   deleting all information from said secure account or device.

6. The method of claim 3, wherein said performing said security functions further comprises:
   enabling, by an administrator, said username for access to said secure account or device.

7. The method of claim 1, wherein said quality factor indicates a specified level of quality of said incorrect passcode with respect to said passcode, wherein said results of said comparing indicate that said quality factor exceeds said predetermined threshold, and wherein said performing said security functions comprises:
   locking said secure account or device from being accessed.

8. The method of claim 7, wherein said performing said security functions further comprises:
   determining that a specified time period has elapsed; and
   enabling access to said secure account or device.

9. The method of claim 7, wherein said performing said security functions further comprises:

enabling access from an alternative location to said secure account or device.

10. The method of claim 1, wherein said quality factor indicates a specified level of quality of said incorrect passcode with respect to said passcode, wherein said results of said comparing indicate that said quality factor exceeds said predetermined threshold, and wherein said performing said security functions comprises:

deleting all information from said secure account or device.

11. The method of claim 1, wherein said quality factor indicates a specified level of quality of said incorrect passcode with respect to said passcode, wherein said results of said comparing indicate that said quality factor is less than said predetermined threshold, and wherein said performing said security functions comprises:

determining, based on said specified level of quality, that a lockout function of said secure account or device is not required; and indicating that said secure account or device has been locked out.

12. The method of claim 1, wherein said quality factor indicates a specified level of quality of said incorrect passcode with respect to said passcode, wherein said results of said comparing indicate that said quality factor is less than said predetermined threshold, and wherein said performing said security functions comprises:

determining, based on said specified level of quality, that a system memory wipe function of said secure account or device is not required; and indicating that said system memory wipe function of said secure account or device secure account has been performed.

13. The method of claim 1, further comprising:

providing at least one support service for at least one of creating, integrating, hosting, maintaining, and deploying computer-readable code in the computing system, said code being executed by the computer processor to implement: said receiving, said determining said unauthorized access attempts, said determining said quality factor, said comparing, and said performing.

14. A computing system comprising a computer processor coupled to a computer-readable memory unit, said memory unit comprising instructions that when executed by the computer processor implements an unauthorized passcode access reduction method comprising:

remotely receiving over a network, by said computer processor from a user via a remote system comprising a first IP address, a username of a user and a passcode for access to a secure account or device belonging to said user, wherein said first IP address differs from a second IP address of said computing system;

determining, by said computer processor based on said passcode being determined as an incorrect passcode and determining that said user is accessing said computing system via said first IP address, unauthorized access attempts associated with said secure account or device;

determining, by said computer processor, a quality factor associated with said incorrect passcode with respect to said secure account or device, wherein said quality factor indicates a specified percentage and associated correct position of correct characters within said passcode;

comparing, by said computer processor, said quality factor to a predetermined threshold percentage value indicating a threshold percentage and position of correct characters within said passcode; and performing, by said computer processor based on results of said comparing and said unauthorized access attempts, security functions associated with prevention of a false access lockout or reset process with respect to said secure account or device with respect to said incorrect passcode.

15. The computing system of claim 14, wherein said quality factor indicates a progression of a pattern of characters matching characters of said passcode within a specified number of passcode input attempts.

16. The computing system of claim 14, wherein said quality factor indicates a specified level of quality of said incorrect passcode with respect to said passcode, wherein said results of said comparing indicate that said quality factor exceeds said predetermined threshold, and wherein said performing said security functions comprises:

disabling said username from access to said secure account or device.

17. The computing system of claim 16, wherein said performing said security functions further comprises:

locking said secure account or device from being accessed.

18. A computer program product, comprising a computer readable hardware storage device storing a computer readable program code, said computer readable program code comprising an algorithm that when executed by a computer processor of a computer system implements an unauthorized passcode access reduction method, said method comprising:

remotely receiving over a network, by said computer processor from a user via a remote system comprising a first IP address, a username of a user and a passcode for access to a secure account or device belonging to said user, wherein said first IP address differs from a second IP address of said computing system;

determining, by said computer processor based on said passcode being determined as an incorrect passcode and determining that said user is accessing said computing system via said first IP address, unauthorized access attempts associated with said secure account or device;

determining, by said computer processor, a quality factor associated with said incorrect passcode with respect to said secure account or device, wherein said quality factor indicates a specified percentage and associated correct position of correct characters within said passcode;

comparing, by said computer processor, said quality factor to a predetermined threshold percentage value indicating a threshold percentage and position of correct characters within said passcode; and performing, by said computer processor based on results of said comparing and said unauthorized access attempts, security functions associated with prevention of a false access lockout or reset process with respect to said secure account or device with respect to said incorrect passcode.

19. The computer program product of claim 18, wherein said quality factor indicates a progression of a pattern of characters matching characters of said passcode within a specified number of passcode input attempts.

20. The computer program product of claim 18, wherein said quality factor indicates a specified level of quality of said incorrect passcode with respect to said passcode, wherein said results of said comparing indicate that said quality factor exceeds said predetermined threshold, and wherein said performing said security functions comprises:

disabling said username from access to said secure account or device.

* * * * *